United States Patent
Adams et al.

(10) Patent No.: US 8,292,165 B2
(45) Date of Patent: Oct. 23, 2012

(54) SYSTEM AND METHOD OF MULTIPLE SMART CARD DRIVER SUPPORT

(75) Inventors: Neil Patrick Adams, Kitchener (CA); Dinah Lea Marie Davis, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 352 days.

(21) Appl. No.: 12/628,293

(22) Filed: Dec. 1, 2009

(65) Prior Publication Data

US 2010/0140348 A1    Jun. 10, 2010

Related U.S. Application Data

(60) Provisional application No. 61/118,861, filed on Dec. 1, 2008.

(51) Int. Cl.
  *G06K 5/00* (2006.01)
  *G06K 7/00* (2006.01)
(52) U.S. Cl. .......................... 235/380; 235/435
(58) Field of Classification Search .................. 235/380
  See application file for complete search history.

(56) References Cited

U.S. PATENT DOCUMENTS

| | | | |
|---|---|---|---|
| 6,088,450 A * | 7/2000 | Davis et al. | 713/182 |
| 6,942,147 B2 * | 9/2005 | Lahteenmaki et al. | 235/441 |
| 2006/0026602 A1 | 2/2006 | Duplichan | |
| 2008/0011851 A1 * | 1/2008 | Adams et al. | 235/451 |
| 2008/0041951 A1 * | 2/2008 | Adams et al. | 235/435 |

FOREIGN PATENT DOCUMENTS

| | | |
|---|---|---|
| EP | 1890426 A1 | 2/2008 |
| EP | 1973041 A1 | 9/2008 |
| WO | WO 2006048706 A1 * | 5/2006 |

OTHER PUBLICATIONS

Extended European Search Report regarding application No. 09177648.4 dated Mar. 10, 2010.
Microsoft Corporation, msdn Smart Card Subsystem, Aug. 28, 2008.
Sun Microsystems, Inc.,Security and Trust Services API (SATSA) for JavaTM 2 Platform, Micro Edition Version 1.0, Java Community Process (JCP), JSR 177 Expert Group jsr-177-comments@jcp.org, Jul. 28, 2004, Santa Clara California USA.
Derek Adam, Enterprise Smart Card Deployment in the Microsoft Windows Smart Card Framework, Microsoft Corporation, Jun. 2006.

* cited by examiner

*Primary Examiner* — Thien M Le
*Assistant Examiner* — Toan Ly
(74) *Attorney, Agent, or Firm* — Integral Intellectual Property Inc.; Miriam Paton

(57) ABSTRACT

By thoroughly investigating compatibility of a plurality of smart card drivers to applications available on a given smart card, a smart card framework module may be afforded additional flexibility in communications with the smart card. The additional flexibility is allowed by additional checking with a plurality of smart card drivers before communicating with the smart card, rather than simply using the first compatible smart card driver found. Furthermore, when employing an application available on the given smart card, a correct smart card driver is to be selected from among the plurality of smart card drivers.

21 Claims, 6 Drawing Sheets

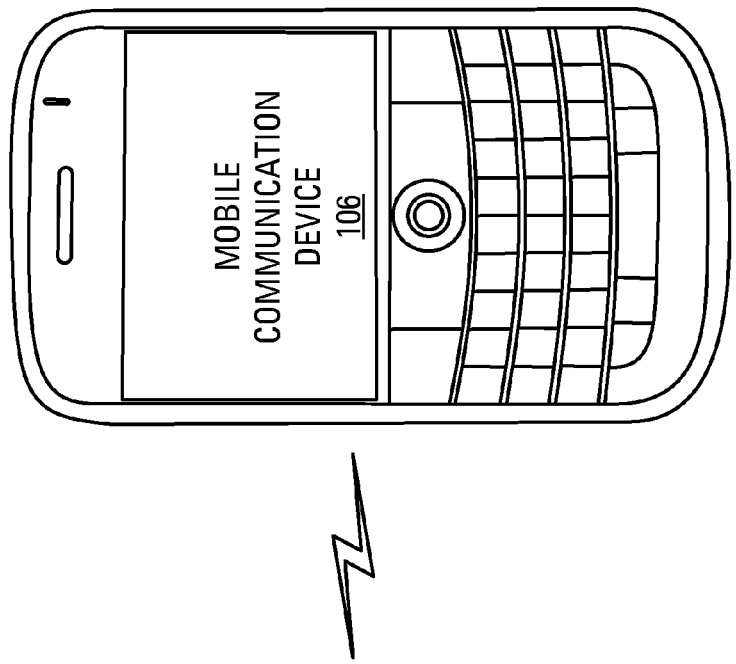
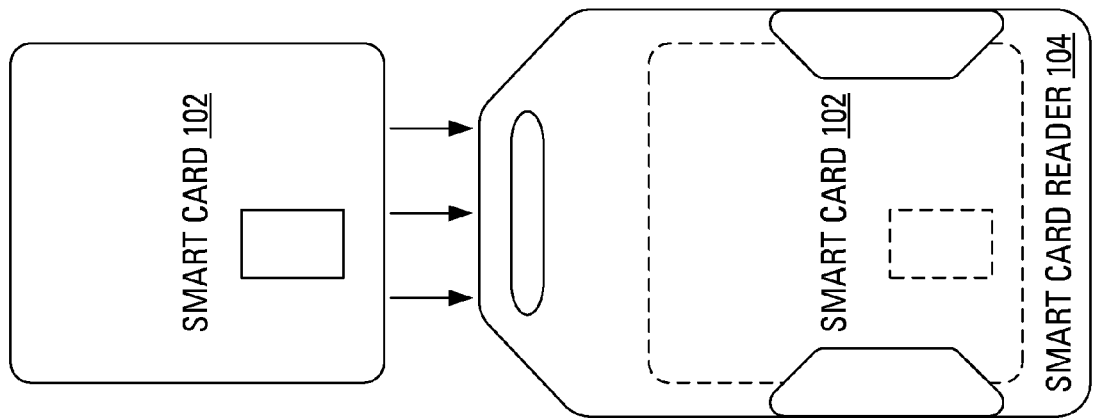
FIG. 1

SYSTEM AND METHOD OF MULTIPLE SMART CARD DRIVER SUPPORT

CROSS-REFERENCE TO RELATED APPLICATION

The present application claims priority from U.S. provisional Patent Application No. 61/118,861, filed Dec. 1, 2008, which is incorporated herein by reference in its entirety.

FIELD OF THE DISCLOSURE

The present application relates generally to communication with smart cards and, more specifically, to a system and method for supporting multiple smart card drivers.

BACKGROUND OF THE DISCLOSURE

A device that reads information from, or writes information to, a smart card typically does so using a smart card reader. The smart card reader may be connected, e.g., through a directly wired connection or a wireless connection, to the device. Specific software, called a "driver", is generally executed by the device to facilitate reading from, and writing to, the memory component of the smart card using the smart card reader. The driver includes an application programming interface (API) that allows other programs to issue requests and commands that will be understood by the driver.

Historically, for a device to use a smart card provided by a particular vendor, the device has been required to execute a driver supplied by the particular vendor. However, as the applications available for execution on smart cards become more standardized, device manufacturers are developing generic smart card drivers that work with a variety of smart cards. Unfortunately, the co-existence, on a given device, of multiple smart card drivers can lead to situations wherein one smart card driver is selected for use in communicating with the smart card, but functions available through the use of another smart card driver are desired.

BRIEF DESCRIPTION OF THE DRAWINGS

Reference will now be made to the drawings, which show, by way of example, embodiments of the disclosure, and in which:

FIG. 1 illustrates an environment in which a smart card is illustrated along with a mobile communication device that communicates wirelessly with a smart card reader;

DETAILED DESCRIPTION OF THE EMBODIMENTS

Figure 2:
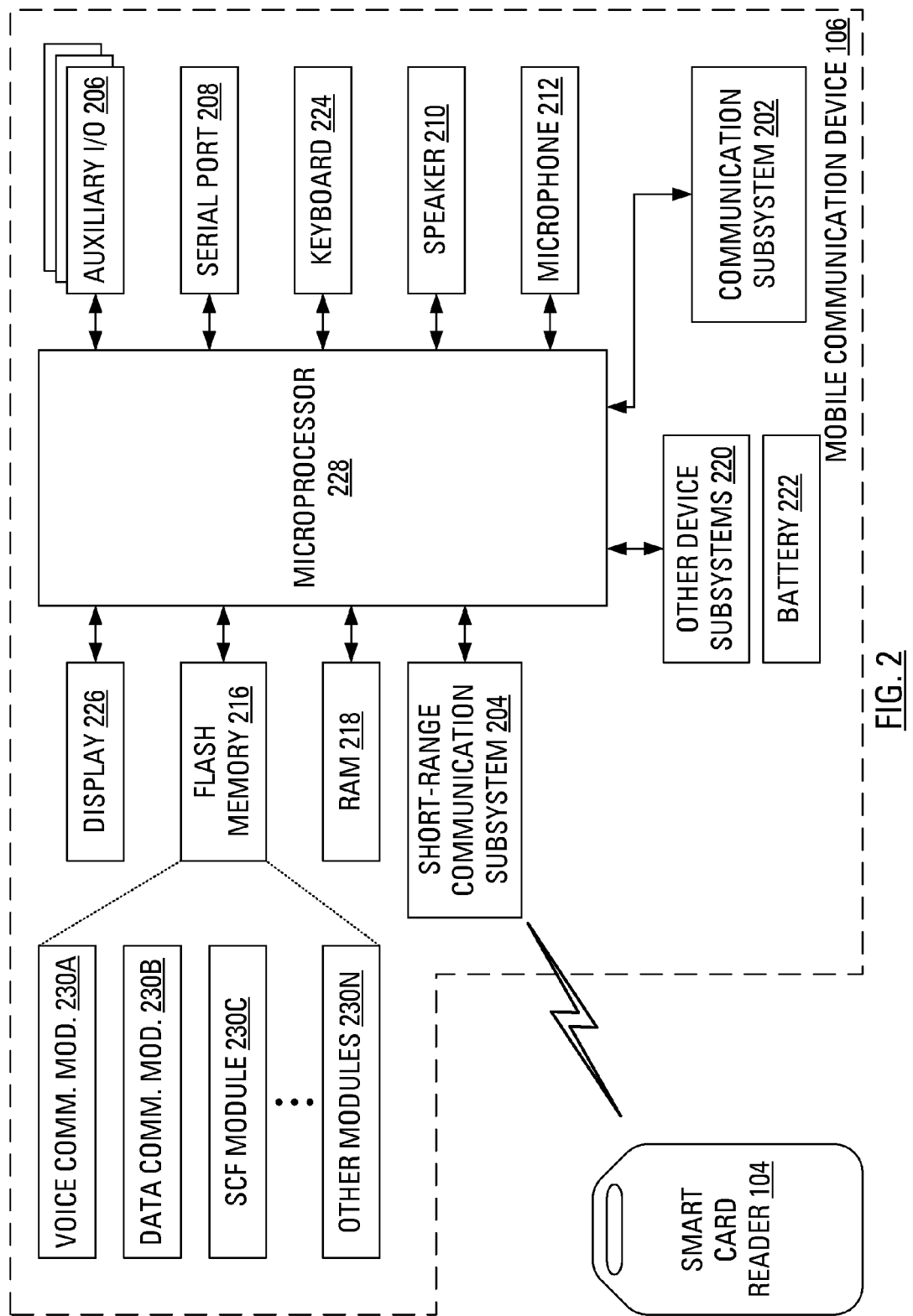
FIG. 2 schematically illustrates the mobile communication device of FIG. 1 including a smart card framework module.

A smart card framework manages a plurality of smart card drivers and their compatibility with applications available on smart cards as the smart cards are introduced. Through recording an association of more than one smart card driver with a given smart card, much more of the potential of the applications available on the smart card may be realized.

In accordance with an aspect of the present application, there is provided a method of initializing communication with a smart card. The method may comprise transmitting a reset command to the smart card, receiving a response to the reset command, selecting a first stored response among a plurality of stored responses, determining that the received response is a match for the first stored response and that the first stored response is associated with a first smart card driver and recording an indication of the first smart card driver in association with an identity of the smart card. The method may further comprise selecting a second stored response among the plurality of stored responses, determining that the received response is a match for the second stored response and that the second stored response is associated with a second smart card driver and recording an indication of the second smart card driver in association with the identity of the smart card. In other aspects of the present application, a communication device is provided for carrying out this method and a computer readable medium is provided for adapting a processor to carry out this method.

In accordance with another aspect of the present application, there is provided, at a communication apparatus, a method of extracting a data object from a smart card. The method may comprise transmitting a query to each smart card driver of a plurality of smart card drivers, receiving, from a first smart card driver of the plurality of smart card drivers, a first response to the query, the first response including an indication that the first smart card driver supports communication with an application on the smart card, receiving, from a second smart card driver of the plurality of smart card drivers, a second response to the query, the second response including an indication that the second smart card driver supports communication with the application on the smart card and selecting a candidate smart card driver from among the first smart card driver and the second smart card driver. The method may further comprise transmitting a data object extraction command to the candidate smart card driver and receiving, from the candidate smart card driver, a first data object extracted from the smart card by the candidate smart card driver. In other aspects of the present application, a communication device is provided for carrying out this method and a computer readable medium is provided for adapting a processor to carry out this method.

In accordance with a further aspect of the present application, there is provided a method of obtaining a signature for a data object. The method may comprise receiving a request to sign a data object with a private cryptographic key, selecting a candidate smart card driver from among a plurality of smart card drivers, the selecting based on the candidate smart card driver being responsible for having imported, from a smart card, a reference to the private cryptographic key, calling the candidate smart card driver with the data object and the reference to the private cryptographic key and receiving a signature from the candidate smart card driver, the signature having been generated at the smart card using the private cryptographic key. In other aspects of the present application, a communication device is provided for carrying out this method and a computer readable medium is provided for adapting a processor to carry out this method.

Other aspects and features of the present disclosure will become apparent to those of ordinary skill in the art upon review of the following description of specific embodiments of the disclosure in conjunction with the accompanying figures.

FIG. 1 illustrates an exemplary communication system 100 that includes a mobile communication device 106 that is enabled to communicate wirelessly with a peripheral device in the form of a smart card reader 104. A smart card 102 is illustrated as available for being received by the smart card reader 104. The smart card 102 may be considered to be an embodiment of an element that may, more generically, be referred to as an identity verification element.

FIG. 2 illustrates the mobile communication device 106 including a housing, an input device (e.g., a keyboard 224 having a plurality of keys) and an output device (e.g., a display 226), which may comprise, for example, a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile communication device 106, in part, responsive to actuation of the keys on the keyboard 224 by a user. Notably, the keyboard 224 may comprise physical buttons (keys) or, in the case in which the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). In the case in which the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile communication device 106 are shown schematically in FIG. 2. These may include a communications subsystem 202, a short-range communications subsystem 204, the keyboard 224 and the display 226. The mobile communication device 106 may further include other input/output devices such as a set of auxiliary I/O devices 206, a serial port 208, a speaker 210 and a microphone 212. The mobile communication device 106 may further include memory devices including a flash memory 216 and a Random Access Memory (RAM) 218. Furthermore, the mobile communication device 106 may include various other device subsystems 220. The mobile communication device 106 may have a battery 222 to power the active elements of the mobile communication device 106. The mobile communication device 106 may, for instance, comprise a two-way radio frequency (RF) communication device having voice and data communication capabilities. In addition, the mobile communication device 106 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the mobile communication device 106. A predetermined set of software applications that control basic device operations, such as a voice communications module 230A and a data communications module 230B, may be installed on the mobile communication device 106 during manufacture. A smart card framework (SCF) module 230C may also be installed on the mobile communication device 106 during manufacture, to implement aspects of the present disclosure. As well, additional software modules, illustrated as another software module 230N, which may be, for instance, a personal information manager (PIM) application, may be installed during manufacture. The PIM application may be capable of organizing and managing data items, such as e-mail messages, calendar events, voice mail messages, appointments, and task items. The PIM application may also be capable of sending and receiving data items via a wireless carrier network. The data items managed by the PIM application may be seamlessly integrated, synchronized and updated via the wireless carrier network with the device user's corresponding data items stored or associated with a host computer system.

Communication functions, including data and voice communications, may be performed through the communication subsystem 202 and through the short-range communications subsystem 204.

The short-range communications subsystem 204 enables communication between the mobile communication device 106 and other proximate systems or devices, which need not necessarily be similar devices. For example, the short-range communications subsystem 204 may include a Bluetooth™ communication module to provide for communication with the smart card reader 104 in the case in which the smart card reader also implements a Bluetooth™ communication module. As another example, the short-range communications subsystem 204 may include an infrared device to provide for communication with similarly-enabled systems and devices.

With a view to allowing the mobile communication device 106 to employ functionality built-in to the smart card 102, in the case in which the smart card 102 has been provided by a particular vendor, it is known that the smart card framework module 230C of the mobile communication device 106 may register a smart card driver supplied by the vendor. Employing functionality built-in to the smart card 102 may involve, for example, providing input data to the smart card 102 and instructing the smart card 102 to execute an application to process the input data to, in some cases, produce output data.

As an early step in employing functionality built-in to the smart card 102, the user establishes a communication coupling between the smart card 102 and the smart card reader 104. In some embodiments, the smart card 102 may be a so-called "contact" smart card, which is inserted into a physical interface of the smart card reader 104 to establish a communication coupling. In such a case, there is a physical coupling of the smart card 102 to the smart card reader 104. In other embodiments, the smart card 102 may be a so-called "contactless" smart card, for which a communication coupling to the smart card reader 104 may be established over a wireless interface. The user then establishes a communication coupling between the smart card reader 104 and the mobile communication device 106, if such a coupling has not already been established.

Upon establishing a communication coupling between the smart card 102 and the smart card reader 104, the smart card reader 104 may indicate, to the smart card framework module 230C of the mobile communication device 106, that such a communication coupling has been recently established. Responsive to receiving the indication, the smart card framework module 230C may arrange, through use of the short-range communications subsystem 204, to transmit a RESET command to the smart card 102.

Responsive to receiving the RESET command, the smart card 102 transmits, using the smart card reader 104, a response to the RESET command. Typically, smart cards are arranged to provide a response to a RESET command in a manner specific to the particular smart card 102.

It has been discussed above that the smart card framework module 230C of the mobile communication device 106 may register smart card drivers supplied by various vendors. Such registration may involve associating various responses to a RESET command with specific smart card applications that have corresponding registered smart card drivers.

Responsive to receiving a response from the smart card 102, the smart card framework module 230C may select a stored response from among a plurality of stored responses, each of the plurality of stored responses being associated with a smart card application that is associated with a registered smart card driver.

The smart card framework module 230C may then compare the received response to the selected stored response and determine whether the selected stored response matches the received response. Responsive to determining that the selected stored response matches the received response, the smart card framework module 230C may then record an indication of the smart card driver associated with the selected stored response in association with an identity of the smart card 102 and consider the task of selecting a smart card driver to be complete.

Responsive to determining that the selected stored response does not match the received response, the smart card framework module 230C may determine whether there are stored responses yet to be selected. Responsive to determining that there are stored responses yet to be selected, the smart card framework module 230C may then select a further stored response from among the stored responses yet to be selected and repeat the comparing and determining until a match is found. The selection may occur logically, progressing through a list of the stored responses in a particular order.

Responsive to determining that there are no stored responses yet to be selected, the smart card framework module 230C may consider the task of selecting a smart card driver to be complete.

It is typical that only one smart card driver is selected to facilitate communication with the smart card 102. The selection of a single smart card driver is based on an assumption that only one application is available for execution on the smart card 102. However, that assumption is becoming more frequently invalid as smart card vendors expand the capabilities of their products. In an example case, a smart card vendor may include on a smart card two applications: one application specific to the vendor; and one application adhering to a particular standard.

For example, a given smart card from a given vendor may contain a Personal Identity Verification (PIV) application. PIV applications generally adhere to a US Federal Information Processing Standard (FIPS) number 201. The given smart card may also contain a given-vendor-specific application.

Consider the smart card framework module 230C comparing a response, received from the given smart card, to each of a plurality of stored responses. As discussed hereinbefore, the comparison may occur logically, progressing through a list of stored responses in a particular order. Accordingly, the smart card framework module 230C may locate a match for the received response in a stored response that is associated with the PIV application before locating a match for the received response in a stored response that is associated with the given-vendor-specific application. As a result, the smart card framework module 230C may select the smart card driver associated with the PIV application rather than the smart card driver associated with the given-vendor-specific application. Such a selection may be based on nothing more that the particular order in which the stored responses, associated with the various smart card drivers, are stored.

Upon selecting the smart card driver associated with the PIV application, the smart card framework module 230C may use the smart card driver associated with the PIV application for communicating with the smart card 102. While many similarities may exist between the PIV application and the given-vendor-specific application, it is unlikely that the smart card framework module 230C using the PIV application will be able to recognize objects in the given-vendor-specific application. Similarly, it is unlikely that the smart card framework module 230C using the given-vendor-specific application will be able to recognize objects in the PIV application.

The given vendor typically writes the smart card driver for the given-vendor-specific application, but another vendor may write a driver to talk to the standardized application. Due to the standardization, the driver written to talk to the standardized application is expected to function properly with any smart card that implements the standardized application, without regard for the identity of the smart card vendor.

One way to deal with dual-application smart cards involves the vendor supplying a single driver, which is able to utilize both applications. However, such a solution involves significant work for the vendors, since each of the vendors adds standardized logic into the smart card driver already configured for the given-vendor-specific application. At the same time, the manufacturer of the mobile communication device 106 is generally unlikely to undertake to write code to talk to each of potentially many given-vendor-specific applications.

When there are two or more applications executable for a given smart card, a user may only desire the use of one of the applications. This may be seen as problematic in that both drivers may be on the mobile communication device 106 at once; the standardized driver being included in the code with which the mobile communication device 106 shipped and the given-vendor-specific application being loaded onto the mobile communication device 106 in conjunction with the setup of use of the given-vendor-specific smart card.

Figure 3:
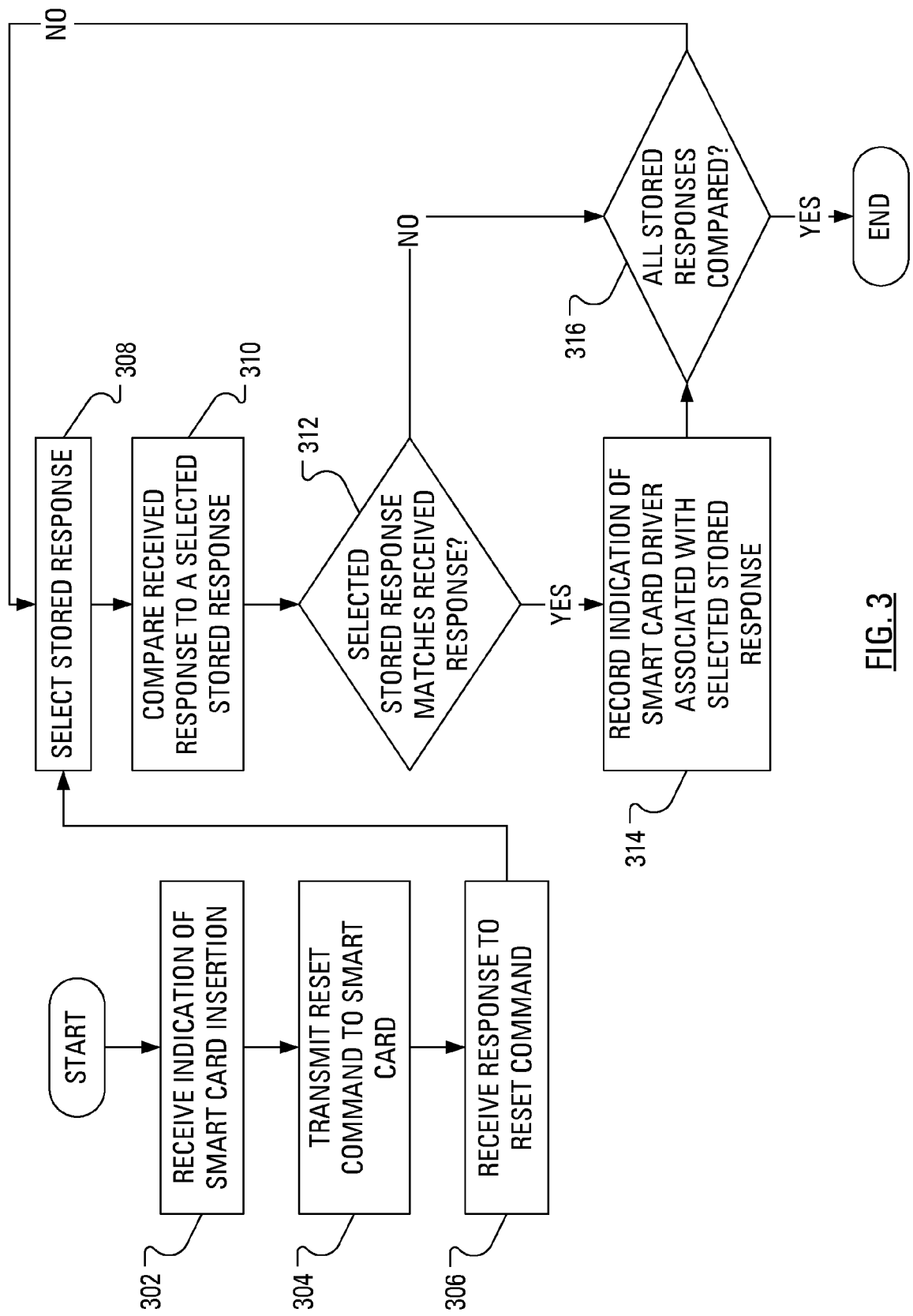
FIG. 3 illustrates steps in an example method of selecting a smart card driver to associate with the smart card of FIG. 1, as may be carried out by the smart card framework module of FIG. 2, in accordance with an embodiment.

In overview, a novel method for execution by the smart card framework module 230C does not stop considering stored responses upon locating a match to a received response. Instead, according to the novel method, example steps of which are illustrated in FIG. 3, the consideration of stored responses, and recording indications of those smart card drivers associated with stored responses that match the received response, continues until all stored responses have been compared.

Upon establishing a communication coupling between the smart card 102 and the smart card reader 104, the smart card reader 104 may indicate, to the smart card framework module 230C of the mobile communication device 106, that such a communication coupling has been recently established. In view of FIG. 3, responsive to receiving the indication (step 302), the smart card framework module 230C may arrange, through use of the short-range communications subsystem 204, to transmit (step 304) a RESET command to the smart card 102. As discussed hereinbefore, responsive to receiving the RESET command, the smart card 102 transmits, using the smart card reader 104, a response to the RESET command.

Responsive to receiving (step 306) a response from the smart card 102, the smart card framework module 230C may select (step 308) a stored response from among a plurality of stored responses, each of the plurality of stored responses being associated with a smart card application that associated with a registered smart card driver.

The smart card framework module 230C may then compare (step 310) the received response to the selected stored response and determine (step 312) whether the selected stored response matches the received response. Responsive to determining (step 312) that the selected stored response matches the received response, the smart card framework module 230C may then record (step 314) an indication of the smart card driver associated with the selected stored response in association with an identity of the smart card 102.

Upon recording (step 314) the indication of the smart card driver associated with the selected stored response, the smart card framework module 230C may determine (step 316) whether there are stored responses yet to be selected. Responsive to determining (step 316) that there are stored responses yet to be selected, the smart card framework module 230C may then select (step 308) a further stored response from among the stored responses yet to be selected and repeat the comparing and conditional recording. The selection (step 308) may occur logically, progressing through a list of the stored responses in a particular order.

Responsive to determining (step 312) that the selected stored response does not match the received response, the smart card framework module 230C may determine (step 316) whether there are stored responses yet to be selected. Responsive to determining (step 316) that there are stored responses yet to be selected, the smart card framework module 230C may then select (step 308) a further stored response from among the stored responses yet to be selected and repeat the comparing and conditional recording until all stored responses have been selected. The selection (step 308) may occur logically, progressing through a list of the stored responses in a particular order.

Responsive to determining (step 314) that there are no stored responses yet to be selected, the smart card framework module 230C may consider the task of selecting a smart card driver to be complete.

According to the method of FIG. 3, the smart card framework module 230C may have previously recorded an indication of a first smart card driver associated with a PIV application. The smart card framework module 230C may also have previously recorded an indication of a second smart card driver associated with the given-vendor-specific application.

Occasionally, it will be desired that the smart card framework module 230C import smart card certificates from the smart card 102. Similarly, it will be desired that the smart card framework module 230C import smart card pointers from the smart card 102, in the case in which the pointers relate to the location of specific cryptographic keys stored on the smart card 102. A smart card certificate often comprises a public cryptographic key digitally signed with private cryptographic key, with the private cryptographic key being associated with an issuer of the smart card certificate. The issuer may be known as a Certification Authority or "CA". The public cryptographic key may be associated with the smart card 102.

Figure 4:
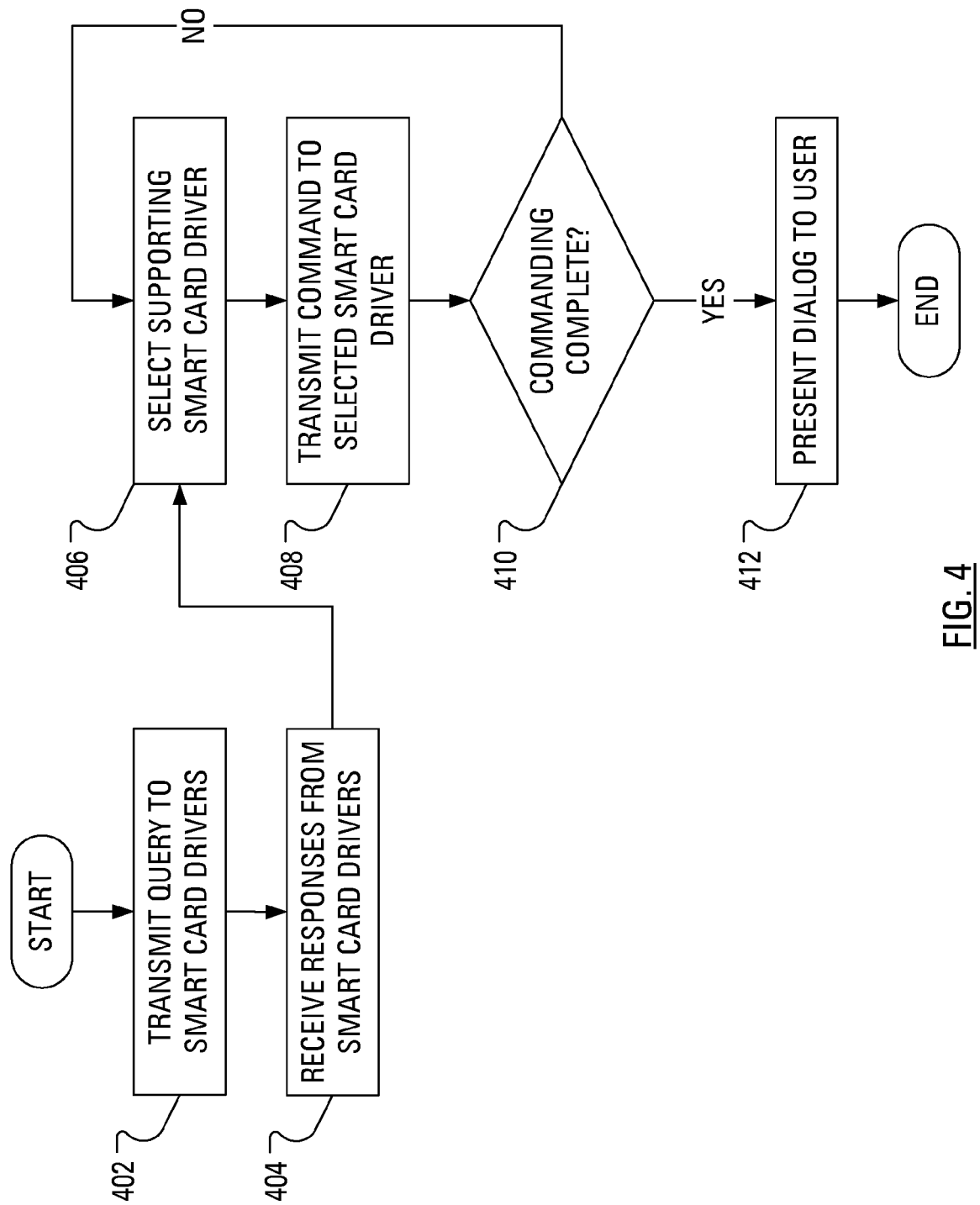
FIG. 4 illustrates steps in an example method of importing certificates from the smart card of FIG. 1, as may be carried out by the smart card framework module of FIG. 2, in accordance with an embodiment.

Example steps carried out by the smart card framework module 230C in a method of importing certificates from the smart card 102 are presented in FIG. 4. The smart card framework module 230C first transmits a query (step 402) to each smart card driver of a plurality of registered smart card drivers. The query identifies the particular smart card 102 to the smart card driver and requests a response that indicates whether the smart card driver supports the smart card 102. The smart card framework module 230C then receives responses (step 404) from the smart card drivers.

The smart card framework module 230C then selects (step 406) one of the smart card drivers that supports the smart card 102 and transmits a command (step 408) to the selected smart card driver. In particular, the smart card framework module 230C commands the selected smart card driver to import certificates from the smart card 102. As will be clear to a person of ordinary skill in the art, the selected smart card driver may import only those certificates from the smart card 102 of which the selected smart card driver is aware.

The smart card framework module 230C then determines (step 410) whether there are smart card drivers that support the smart card 102 and to which a certificate importing command has not yet been sent. Responsive to determining (step 410) that there are smart card drivers that support the smart card 102 and to which a certificate importing command has not yet been sent, the smart card framework module 230C selects (step 406) a further smart card driver and repeats the command transmission (step 408).

Upon determining (step 410) that there are no more smart card drivers that support the smart card 102 and to which a certificate importing command has not yet been sent, the smart card framework module 230C presents (step 412) the user with a user interface, say, in the form of a dialog. The dialog presents an identification of all of the certificates imported by the selected smart card drivers.

Advantageously, the user is generally unaware of any correlation between a certificate identified in the dialog and the smart card driver responsible for importing the identified certificate. An exception may arise when the user is prompted to provide input to facilitate the importing. For example, a password or a personal identification number (PIN) may be necessary to import certificates using a particular smart card driver that corresponds to a particular application executed on the smart card 102.

The applicants have recognized that, by recording indications of more than one smart card driver compatible with a given smart card, some additional complexity is added to routine smart card procedures.

In the course of importing certificates, as illustrated in FIG. 4, the smart card framework module 230C may import at least one smart card certificate associated with a private key. As is known, a smart card certificate associated with a private key will contain a pointer to the private key on the smart card 102. Upon importing a smart card certificate associated with a private key, the smart card driver performing the importing creates a private key object.

Figure 5:
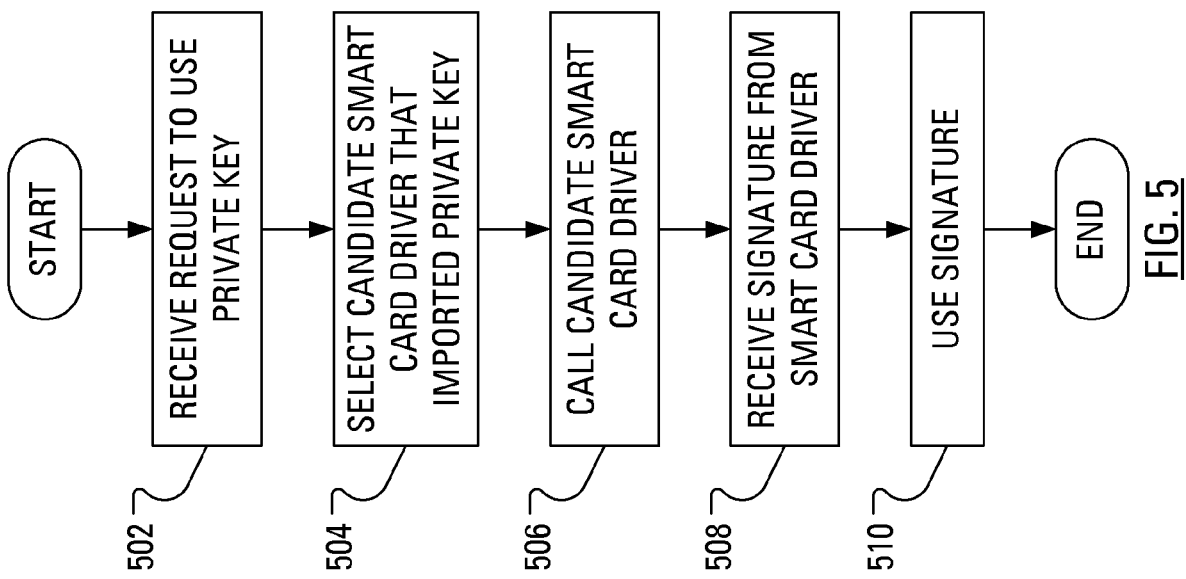
FIG. 5 illustrates steps in an example method of signing a data object with a private key stored on the smart card of FIG. 1, as may be carried out by the smart card framework module of FIG. 2, in accordance with an embodiment.

Example steps carried out by the smart card framework module 230C in a method of signing a data object with a private key stored on the smart card 102 are presented in FIG. 5. The data object may comprise, for example, an e-mail message, an appointment request, a calendar entry or an address book entry. The smart card framework module 230C first receives (step 502) a request to use the private key, for example, for use in signing a data object. Responsive to receiving such a request, the smart card framework module 230C selects (step 504), from among the compatible smart card drivers, a candidate smart card driver, the selection being based on the candidate smart card driver being the smart card driver that imported the pointer to the private key. The smart card framework module 230C then calls (step 506) the candidate smart card driver. As part of the call, the smart card framework module 230C includes a data object upon which the private key is to act.

Figure 6:
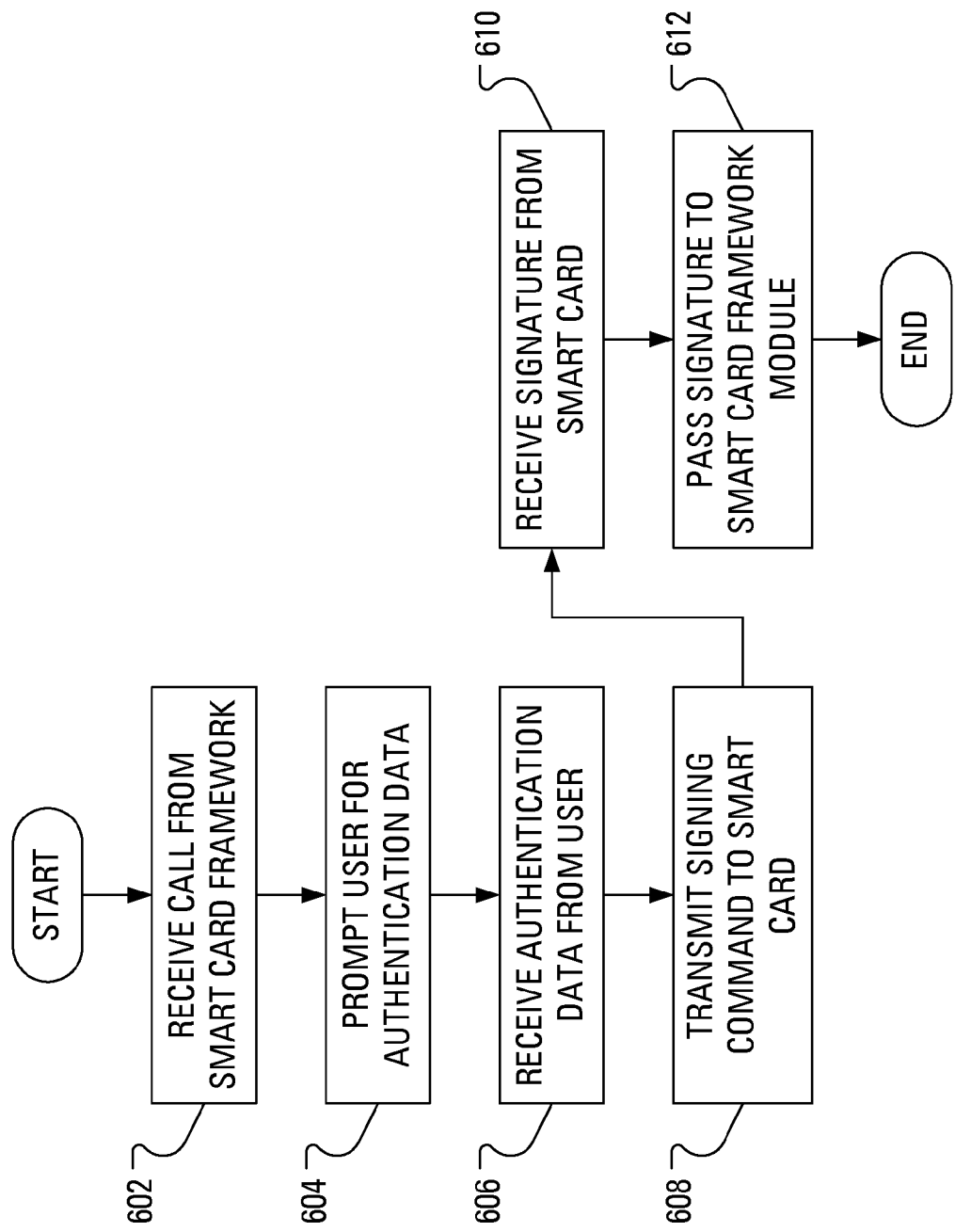
FIG. 6 illustrates steps in a method, carried out by a smart card driver, of providing a signature, generated at the smart card of FIG. 1, to the smart card framework module of FIG. 2.

Example steps in a method of reacting, at the candidate smart card driver, to receiving a call (step 602) from the smart card framework module 230C are presented in FIG. 6. The candidate smart card driver may arrange the presentation of a prompt (step 604) to prompt the user to provide authentication data, such as a smart card PIN, to authenticate access to the private key. As there may be a distinct PIN associated with each application, the prompt may contain information about the PIN to which the prompt relates. The candidate smart card driver receives (step 606) the authentication data from the user and transmits (step 608) a signing command to the smart card 102. The signing command may include such elements as a pointer to the private key, the data object upon which the private key is to act and the authentication data received from the user.

Responsive to receiving the pointer, data object and authentication data, the application on the smart card 102 may execute. At the termination of the execution of the application, the smart card 102 may transmit a signature for the data object to the mobile communication device 106.

At the mobile communication device 106, the candidate smart card driver receives the signature (step 610) and passes (step 612) the received signature to the smart card framework module 230C. The smart card framework module 230C receives the signature (step 508, FIG. 5) from the candidate smart card driver and makes use of the signature in the intended manner (step 510).

Notably, the selection of the smart card driver (step 504) among many compatible smart card drivers would not typically be necessary in a smart card framework module that needs only to communicate with a single smart card driver, i.e., the smart card driver an indication of which was recorded.

As will be clear to a person of ordinary skill in the art, the method for which example steps are presented in FIG. 4 and the method for which example steps are presented in FIG. 5 may be applied to a wide variety of situations beyond the examples. For instance, rather than importing certificates in the method of FIG. 4, the smart card drivers may import fingerprint templates for use in biometric authentication. In the case in which the biometric authentication is handled by an application on the smart card 102, the method of FIG. 5 may be appropriate with a change in the structure of the call to the smart card driver in step 506.

The user of the mobile communication device 106 may enable multi-factor authentication. In one example of multi-factor authentication, the user is prompted to supply a smart-card-specific PIN to unlock the mobile communication device 106.

Currently, to initialize the user authenticator, the user enters a PIN while maintaining the smart card reader 104, which is coupled to the smart card 102, in communication distance with the mobile communication device 106. Responsive to receiving the PIN, the smart card framework module 230C queries the smart card drivers to select a smart card driver compatible with the smart card 102. Upon selecting a smart card driver compatible with the smart card 102, the smart card framework module 230C issues a command to the selected smart card driver. According to the command, the selected smart card driver passes the PIN to the smart card 102 to determine whether the supplied PIN is correct.

However, as discussed, there may be multiple smart card drivers available to the smart card framework module 230C, in the case in which each smart card driver is for handling communications with a distinct application among multiple applications on the smart card 102. Furthermore, each of the multiple applications may have a different PIN. Accordingly, the PIN of the application associated with the selected smart card driver may not match the PIN supplied by the user.

According to aspects of the present application, as part of the first authentication subsequent to enabling multi factor authentication, the smart card framework module 230C prompts the user to choose a specific smart card application to perform the authentication. Based on the user's choice of application, to verify a subsequent supplied PIN, the smart card framework module 230C calls the smart card driver corresponding to the chosen application.

The user is only prompted to choose a smart card application during the first authentication subsequent to enabling multi factor authentication. During subsequent authentication session, the user simply enters the PIN and the smart card framework module 230C calls the correct smart card driver.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of initializing communication with a smart card, said method comprising:
   transmitting a reset command to said smart card;
   receiving a response to said reset command;
   comparing said received response to a first stored response selected from a plurality of stored responses;
   determining that said received response matches said first stored response and that said first stored response is associated with a first smart card application that is associated with a first smart card driver;
   recording an indication of said first smart card driver in association with an identity of said smart card;
   comparing said received response to a second stored response selected from said plurality of stored responses;
   determining that said received response matches said second stored response and that said second stored response is associated with a second smart card application that is associated with a second smart card driver;
   recording an indication of said second smart card driver in association with said identity of said smart card;
   prompting for selection of one of said first smart card application and said second smart card application to perform an authentication;
   receiving an indication of a selected application selected from one of said first smart card application and said second smart card application;
   prompting for entry of authentication data associated with said selected application; and
   responsive to receiving purported authentication data, calling the one of said first smart card driver and said second smart card driver that is associated with said selected application to handle communications with said selected application during said authentication.

2. The method of claim 1 further comprising:
receiving an indication of establishment of a communication coupling between said smart card and a smart card reader;
wherein said transmitting is responsive to said receiving said indication of establishment.

3. The method of claim 2 wherein said indication of establishment indicates insertion of said smart card into said smart card reader.

4. The method of claim 1 further comprising:
subsequent to said recording said indication of said first smart card driver in association with said identity of said smart card, determining that not all stored responses have been compared to said received response; and
performing said comparing of said received response to said second stored response responsive to said determining that not all stored responses have been compared to said received response.

5. The method of claim 1, further comprising:
where said authentication is successful, during a subsequent authentication, prompting said user to provide said authentication data associated with said selected application without prompting said user to select one of said first smart card application and said second smart card application to perform said subsequent authentication, and calling the one of said first smart card driver and said second smart card driver that is associated with said selected application to handle communications with said selected application.

6. A communication device comprising:
a short-range communications subsystem operable to:
transmit a reset command to a smart card; and
receive a response to said reset command; and
a processor adapted to execute a smart card framework module:
to compare said received response to a first stored response selected from a plurality of stored responses;
to determine that said received response matches said first stored response and that said first stored response is associated with a first smart card application that is associated with a first smart card driver;
to record an indication of said first smart card driver in association with an identity of said smart card;
to compare said received response to a second stored response selected from said plurality of stored responses;
to determine that said received response matches said second stored response and that said second stored response is associated with a second smart card application that is associated with a second smart card driver;
to record an indication of said second smart card driver in association with said identity of said smart card;
to prompt, via a user interface of said communication device, for selection of one of said first smart card application and said second smart card application to perform an authentication;
to receive, via an input component of said communication device, an indication of a selected application selected from one of said first smart card application and said second smart card application;
to prompt, via said user interface, for entry of authentication data associated with said selected application; and
responsive to receiving, via said input component, purported authentication data, to call the one of said first smart card driver and said second smart card driver that is associated with said selected application to handle communications with said selected application during said authentication via said short-range communications subsystem.

7. The communication device of claim 6, wherein said processor is further adapted to execute the smart card framework module:
to receive an indication of establishment of a communication coupling between said smart card and a smart card reader,
wherein said transmitting is responsive to said receiving said indication of establishment.

8. The communication device of claim 7 wherein said indication of establishment indicates insertion of said smart card into said smart card reader.

9. The communication device of claim 6, wherein said processor is further adapted to execute the smart card framework module:
subsequent to said recording said indication of said first smart card driver in association with said identity of said smart card, to determine that not all stored responses have been compared to said received response; and
to perform said comparing of said received response to said second stored response responsive to said determining that not all stored responses have been compared to said received response.

10. A non-transient computer-readable medium containing computer-executable instructions that, when performed by a processor in a communication device, cause said processor:
to transmit a reset command to a smart card;
to receive a response to said reset command;
to compare said received response to a first stored response selected from a plurality of stored responses;
to determine that said received response matches said first stored response and that said first stored response is associated with a first smart card application that is associated with a first smart card driver;
to record an indication of said first smart card driver in association with an identity of said smart card;
to compare said received response to a second stored response selected from said plurality of stored responses;
to determine that said received response matches said second stored response and that said second stored response is associated with a second smart card application that is associated with a second smart card driver;
to record an indication of said second smart card driver in association with said identity of said smart card;
to prompt for selection of one of said first smart card application and said second smart card application to perform an authentication;
to receive an indication of a selected application selected from one of said first smart card application and said second smart card application;
to prompt for entry of authentication data associated with said selected application; and
responsive to receiving purported authentication data, to call the one of said first smart card driver and said second smart card driver that is associated with said selected application to handle communications with said selected application during said authentication.

11. At a communication apparatus, a method of extracting a data object from a smart card, said method comprising:
transmitting a query to each smart card driver of a plurality of smart card drivers;
receiving, from a first smart card driver of said plurality of smart card drivers, a first response to said query, said first response including an indication that said first smart card driver supports communication with an application on said smart card;

receiving, from a second smart card driver of said plurality of smart card drivers, a second response to said query, said second response including an indication that said second smart card driver supports communication with said application or a different application on said smart card;

selecting a candidate smart card driver from among said first smart card driver and said second smart card driver;

transmitting a data object extraction command to said candidate smart card driver; and receiving, from said candidate smart card driver, a first data object extracted from said smart card by said candidate smart card driver.

12. The method of claim 11 further comprising:

selecting a further candidate smart card driver as the non-previously selected smart card driver of said first smart card driver and said second smart card driver;

transmitting said data object extraction command to said further candidate smart card driver; and receiving, from said further candidate smart card driver, a second data object extracted from said smart card by said further candidate smart card driver.

13. The method of claim 12 further comprising presenting a user interface at said communication apparatus, said user interface allowing user selection of a candidate data object from among said first data object and said second data object.

14. The method of claim 11 wherein said first data object comprises a certificate.

15. The method of claim 11 wherein said first data object comprises a fingerprint template.

16. A communication apparatus comprising:

a short-range communications subsystem operable:
  to transmit a query to each smart card driver of a plurality of smart card drivers;
  to receive, from a first smart card driver of said plurality of smart card drivers, a first response to said query, said first response including an indication that said first smart card driver supports communication with an application on a given smart card; and
  to receive, from a second smart card driver of said plurality of smart card drivers, a second response to said query, said second response including an indication that said second smart card driver supports communication with said application or a different application on said smart card; and a processor adapted to execute a smart card framework module:
  to select a candidate smart card driver from among said first smart card driver and said second smart card driver;

wherein said short-range communications subsystem is further operable:
    to transmit a data object extraction command to said candidate smart card driver; and
    to receive, from said candidate smart card driver, a first data object extracted from said smart card by said candidate smart card driver.

17. The communication device of claim 16 wherein said processor is further adapted to execute the smart card framework module:
  to select a further candidate smart card driver as the non-previously selected smart card driver of said first smart card driver and said second smart card driver;
  to transmit said data object extraction command to said further candidate smart card driver; and
  to receive, from said further candidate smart card driver, a second data object extracted from said smart card by said further candidate smart card driver.

18. The communication device of claim 17 further comprising:
  a user interface allowing user selection of a candidate data object from among said first data object and said second data object.

19. The communication device of claim 16 wherein said first data object comprises a certificate.

20. The communication device of claim 16 wherein said first data object comprises a fingerprint template.

21. A non-transient computer-readable medium containing computer-executable instructions that, when performed by a processor in a communication device, cause said processor:
  to transmit a query to each smart card driver of a plurality of smart card drivers;
  to receive, from a first smart card driver of said plurality of smart card drivers, a first response to said query, said first response including an indication that said first smart card driver supports communication with an application on a given smart card;
  to receive, from a second smart card driver of said plurality of smart card drivers, a second response to said query, said second response including an indication that said second smart card driver supports communication with said application or a different application on said smart card;
  to select a candidate smart card driver from among said first smart card driver and said second smart card driver;
  to transmit a data object extraction command to said candidate smart card driver; and
  to receive, from said candidate smart card driver, a first data object extracted from said smart card by said candidate smart card driver.

* * * * *